United States Patent
Nakamori et al.

(10) Patent No.: US 6,769,502 B2
(45) Date of Patent: Aug. 3, 2004

(54) OIL PUMP DRIVE CONTROL APPARATUS

(75) Inventors: Yukinori Nakamori, Anjo (JP); Takehiko Suzuki, Anjo (JP); Satoru Wakuta, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/021,576

(22) Filed: Dec. 19, 2001

(65) Prior Publication Data

US 2002/0107103 A1 Aug. 8, 2002

(30) Foreign Application Priority Data

Dec. 28, 2000 (JP) ........................................ 2000-403441

(51) Int. Cl.⁷ .............................................. B60K 41/14
(52) U.S. Cl. ......................... 180/65.2; 477/3; 477/156; 180/65.3
(58) Field of Search .................. 180/305, 306, 180/65.2, 65.3, 65.4; 477/3, 38, 37, 50, 156, 157; 60/428, 429

(56) References Cited

U.S. PATENT DOCUMENTS

| | | | | |
|---|---|---|---|---|
| 5,944,632 A | * | 8/1999 | Hara et al. .................. | 477/158 |
| 6,110,072 A | * | 8/2000 | Harada et al. ............... | 477/157 |
| 6,253,137 B1 | * | 6/2001 | Abo et al. .................... | 701/51 |
| 6,269,788 B1 | * | 8/2001 | Kachelek ................ | 123/196 R |
| 6,269,895 B1 | * | 8/2001 | Tanuguchi et al. ......... | 180/65.2 |
| 6,390,947 B1 | * | 5/2002 | Aoki et al. .................... | 477/3 |

FOREIGN PATENT DOCUMENTS

JP  2000-170888  6/2000

* cited by examiner

Primary Examiner—Brian L. Johnson
Assistant Examiner—Brian L Swenson
(74) Attorney, Agent, or Firm—Lorusso, Loud & Kelly

(57) ABSTRACT

The clutch oil pressure ($P_{C1}$) supplied to a hydraulic controller of an automatic transmission is detected. If it is detected that the clutch oil pressure ($P_{C1}$) is less than or equal to a first threshold value $P_A$ when a first oil pump cooperative with a drive power source is to stop, the second oil pump is driven. Therefore, after the oil pressure (for example, $P_Y$) remaining from the first oil pump has decreased, the second oil pump is driven, and an oil pressure ($P_X$) needed for the hydraulic control of friction engagement elements is maintained. If it is detected that the clutch oil pressure ($P_{C1}$) is greater than or equal to a second threshold value ($P_B$) when the first oil pump is to be driven, the second oil pump is stopped. Therefore, the second oil pump is stopped when the oil pressure provided by the first oil pump rises to such a level that the oil pressure ($P_X$) can be secured. Thus, the load on the second oil pump is reduced so as to allow it to be reduced in size.

13 Claims, 10 Drawing Sheets

|     | C1 | C2 | C3 | B1 | B2 | B3 | B4 | B5 | F1 | F2 |
|-----|----|----|----|----|----|----|----|----|----|----|
| N   |    |    |    |    |    |    |    | ○  |    |    |
| 1ST | ○  |    |    |    |    | △  |    | ○  |    | ○  |
| 2ND | ○  |    |    | △  | ○  |    |    | ○  | ○  |    |
| 3RD | ○  |    |    | △  | ○  |    | ○  |    | ○  |    |
| 4TH | ○  |    | ○  | △  | ○  |    |    |    | ○  |    |
| 5TH | ○  | ○  | ○  |    |    |    |    |    |    |    |
| REV |    | ○  |    |    |    | ○  |    | ○  |    |    |

DRIVE POWER SOURCE STOP FLAG

CLUTCH OIL PRESSURE $P_{C1}$

VALUE OF VOLTAGE OF ELECTRIC OIL PUMP

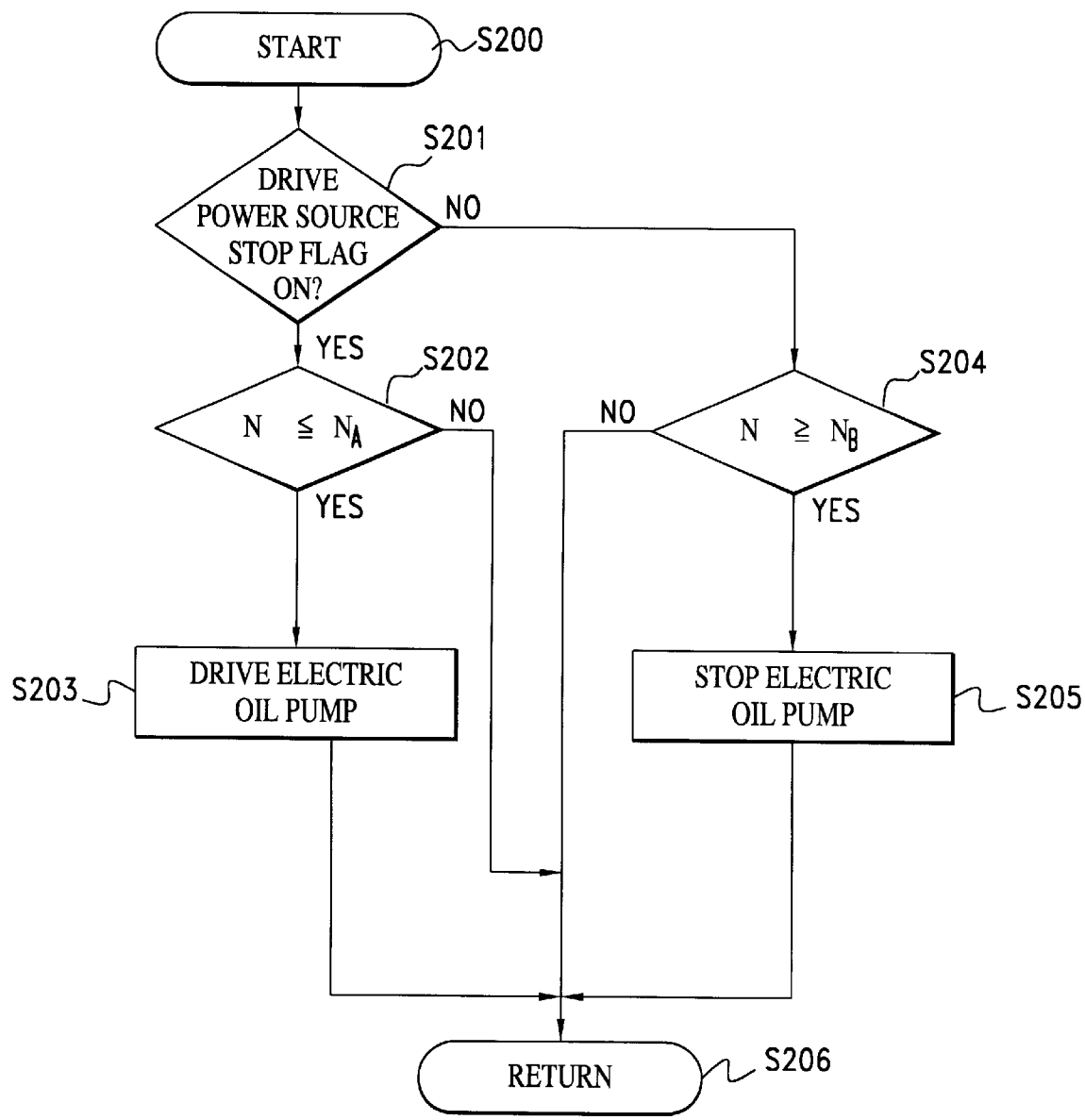

DRIVE POWER SOURCE STOP FLAG

DRIVE POWER SOURCE TURNING SPEED N

CLUTCH OIL PRESSURE $P_{C1}$

VALUE OF VOLTAGE OF ELECTRIC OIL PUMP

OIL PUMP DRIVE CONTROL APPARATUS

INCORPORATION BY REFERENCE

The disclosure of Japanese Patent Application No. 2000-403441 filed on Dec. 28, 2000, including the specification, drawings and abstract thereof, is incorporated herein by reference in its entirety.

BACKGROUND OF THE INVENTION

1. Field of the Invention

The invention relates to an oil pump drive control apparatus that supplies oil pressure to an automatic transmission of a motor vehicle or the like. More particularly, the invention relates to an oil pump drive control apparatus that supplies oil pressure to an automatic transmission of a hybrid vehicle, a vehicle that performs an idling stop, etc., by using a first oil pump driven cooperatively with the drive power source and a second oil pump independent of the drive power source.

2. Description of the Related Art

Recently, in order to reduce emission gas and improve fuel economy, there are provided hybrid vehicles, idling-stop type vehicles, etc. in which a drive power source (e.g., an engine, en electric motor, etc.) is automatically stopped when the vehicle is stopped (or when a predetermined condition is met). Such a vehicle has a mechanical oil pump that is mechanically connected to the drive power source in a cooperative fashion, and an electric oil pump that is electrically driven by a battery or the like independently of the drive power source, in order to supply oil pressure to a hydraulic control apparatus and a speed shift mechanism of an automatic transmission, etc. The vehicle is designed so that when the drive power source is stopped, the mechanical oil pump is stopped, and therefore, the electric oil pump 8, independent of the drive power source, is driven in order to supply a needed oil pressure to the automatic transmission.

An example of the apparatus for driving and controlling the aforementioned oil pumps is an oil pump drive control apparatus disclosed in Japanese Patent Application Laid-Open No. 2000-170888. This apparatus detects a case where it is expected that the mechanical oil pump is not being driven based on a stopped state of the drive power source and the like. On the basis of the detection result, the apparatus supplies oil pressure by driving the electric oil pump, so as to maintain an oil pressure needed for the hydraulic control of the automatic transmission.

However, the oil pump drive control apparatus described in the aforementioned patent application performs a drive control of the electric oil pump based on the stopped state of the drive power source or the like. Therefore, the electric oil pump is driven before the mechanical oil pump stops. The electric oil pump is stopped after the mechanical oil pump is stopped. Therefore, the electric oil pump is driven while a sufficient oil pressure from the mechanical oil pump remains, and the electric oil pump is stopped after the oil pressure from the mechanical oil pump has risen to a sufficiently high level. Hence, there is a problem of increase in the operation load on the electric oil pump. Furthermore, the increased operation load causes increased electric power consumption and reduced amount of charge stored in the battery. Therefore, the operation time of the electric oil pump is reduced and the durability thereof may suffer. Still further, if an electric oil pump is provided so as to withstand the aforementioned load, there arises a problem of an increased size of the electric oil pump.

Contrary to the aforementioned patent application, there is a method in which the electric oil pump is driven after the mechanical oil pump is stopped, and the electric oil pump is stopped before the mechanical oil pump is driven. However, this method has a problem in that the oil pressure needed for the hydraulic control apparatus cannot be maintained, and therefore a shock occurs at the time of restarting the drive power source.

SUMMARY OF THE INVENTION

Accordingly, it is an object of the invention to provide an oil pump drive control apparatus that solves the aforementioned problems by driving and controlling the second oil pump based on the oil pressure of the hydraulic control apparatus.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIGS. 6(a)–6(c) are diagrams indicating the control of the oil pump drive control apparatus in accordance with the invention, wherein FIG. 6(a) is a time chart indicating a drive power source stop flag, and FIG. 6(b) is a time chart indicating the clutch oil pressure, and FIG. 6(c) is a time chart indicating the voltage to the electric oil pump;

FIGS. 8(a) and 8(b) are diagrams indicating a relationship between the drive power source rotational speed and the oil pressure based on the oil temperature, wherein FIG. 8(a) is a diagram indicating the first threshold value, and FIG. 8(b) is a diagram indicating the second threshold value;

FIG. 9 is a flowchart illustrating control of an oil pump drive control apparatus in accordance with the invention; and FIGS. 10(a)–10(d) are diagrams illustrating control of the oil pump drive control apparatus in accordance with the invention, wherein FIG. 10(a) is a time chart indicating a drive power source stop flag, and FIG. 10(b) is a time chart indicating the drive power source rotational speed, and FIG. 10(c) is a time chart indicating the clutch oil pressure, and FIG. 10(d) is a time chart indicating the voltage to an electric oil pump.

DETAILED DESCRIPTION OF PREFERRED EMBODIMENTS

First Embodiment

Figure 1:
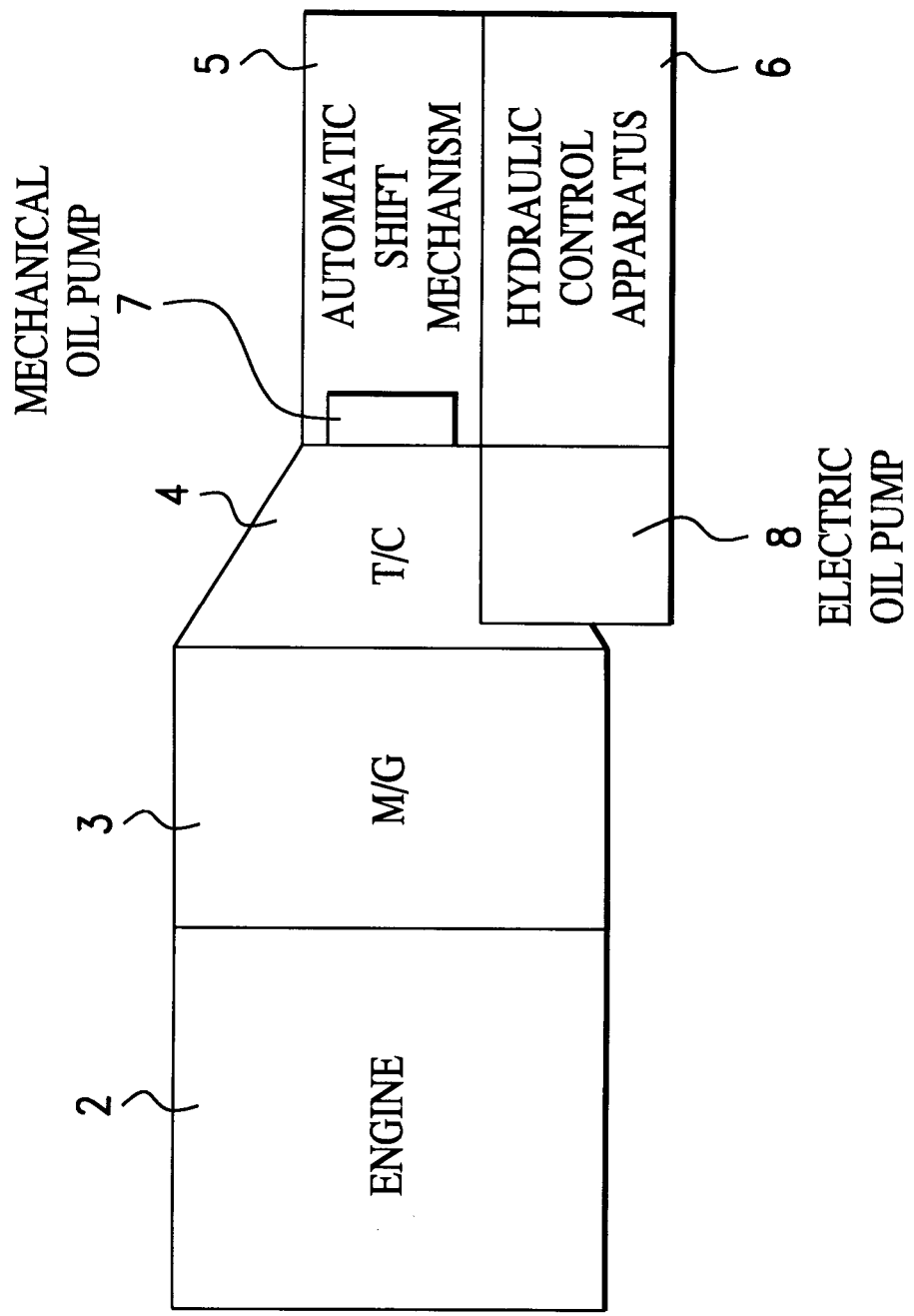
FIG. 1 is a schematic block diagram illustrating a drive system of a vehicle in accordance with the invention.

A first embodiment of the invention will be described with reference to the drawings. FIG. 1 is a schematic block diagram illustrating a drive system of a vehicle in accordance with the invention. As shown in FIG. 1, a drive power source includes an engine 2 and a motor-generator (M/G) 3. The drive power therefrom is output to an automatic shift mechanism 5 via a torque converter (T/C) 4 that forms an automatic transmission. The automatic shift mechanism 5 changes the speed of the input drive power based on a predetermined running condition of the vehicle, and outputs drive power to wheels, etc. The automatic shift mechanism 5 has a plurality of friction engagement elements for shifting the speed and is provided with a hydraulic control apparatus 6 for hydraulically controlling engagement of the friction engagement elements, so as to achieve a speed shift, and for controlling the torque converter 4. Further provided are a first oil pump (hereinafter, referred to as "mechanical oil pump") 7 for supplying oil pressure to the hydraulic control apparatus 6 and a second oil pump (hereinafter, referred to as "electric oil pump"). The mechanical oil pump 7 is disposed so as to cooperate with the torque converter 4. The mechanical oil pump 7 is driven by drive power from the engine 2 and the motor-generator 3. The electric oil pump 8 is independent of the drive power from the engine 2 and the motor-generator 3, and is driven by an electric motor that is supplied with electric power from a battery (not shown).

Figures 2A, 2B:
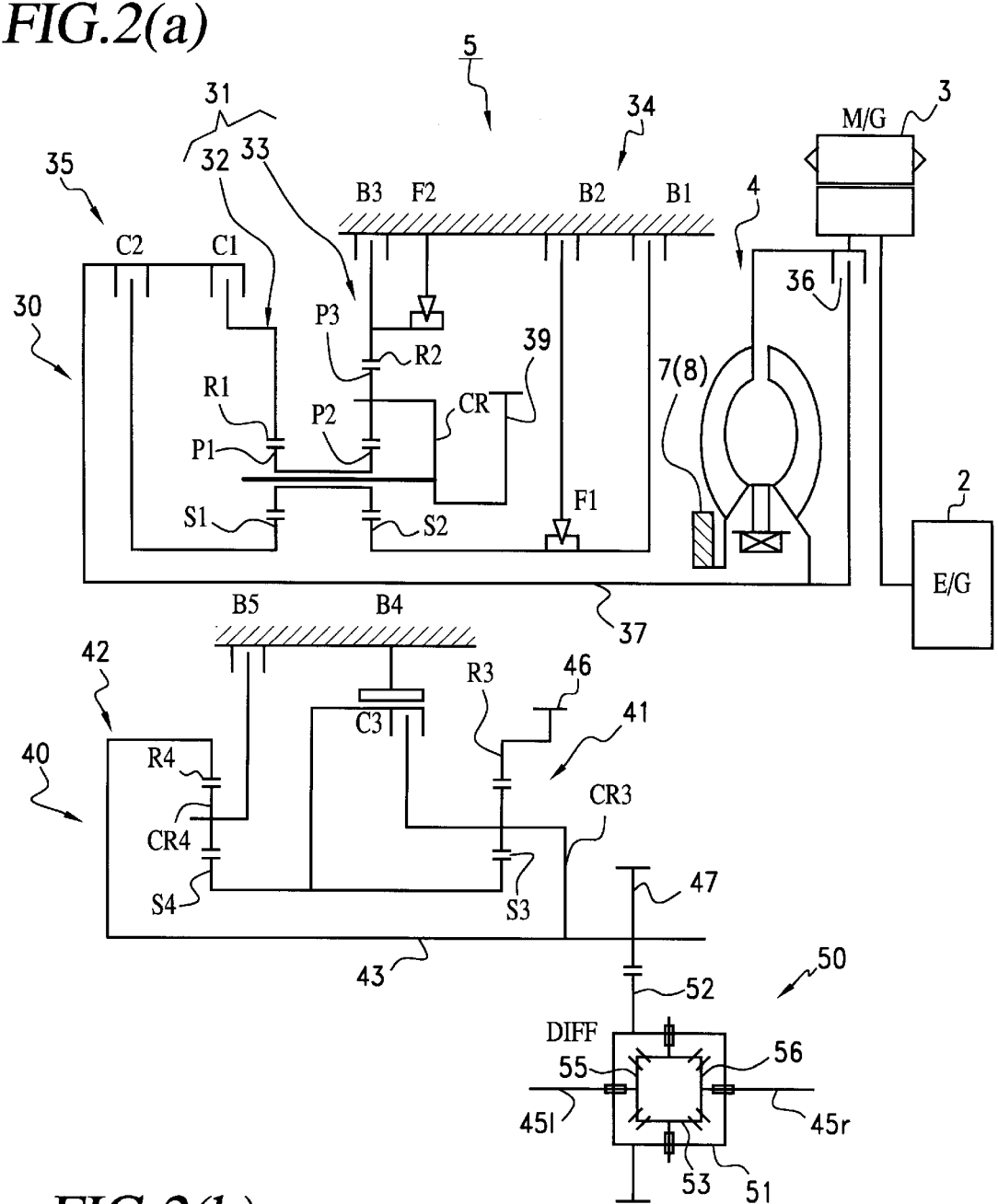
FIG. 2(a) is a skeletal diagram of an automatic shift mechanism to which the invention is applied.
FIG. 2(b) is a table of operations of the automatic shift mechanism.

The automatic shift mechanism 5 will next be described with reference to the drawings. FIG. 2(a) is a skeletal diagram of the automatic shift mechanism 5 to which the invention is applied and FIG. 2(b) is a table of operations of the automatic shift mechanism 5. As shown in FIG. 2(a), the automatic shift mechanism 5 is disposed on a first shaft aligned with an engine output shaft, and has an input shaft 37 to which drive power is transferred from the engine (E/G) 2 and the motor-generator (M/G) 3 via the torque converter 4 having a lockup clutch 36. Disposed sequentially on the first shaft are the mechanical oil pump 7 and the electric oil pump 8 adjacent to the torque converter 4, a brake section 34, a planetary gear section 31, and a clutch section 35 in that order.

The planetary gear section 31 includes a simple planetary gear unit 32 and a double-pinion planetary gear unit 33. The simple planetary gear unit 32 has a sun gear S1, a ring gear R1, and a carrier CR supporting pinions P1 meshed with the sun gear S1 and the ring gear R1. The double-pinion planetary gear unit 33 has a sun gear S2, a ring gear R2, and a carrier CR that supports pinions P2 meshed with the sun gear S2 and pinions P3 meshed with the ring gear R2 so that the pinions P2 and the pinions P3 are meshed with each other. The sun gear S1 and the sun gear S2 are rotatably supported on hollow shafts that, in turn, are rotatably supported on the input shaft 37. The carrier CR of the simple planetary gear 32 and the carrier CR of the double-pinion planetary gear 33 are one and the same carrier. Thus, the pinions P1 meshed with the sun gear S1 and the pinions P2 meshed with the sun gear S2 are interconnected so as to turn together as one unit.

The brake section 34 includes a one-way clutch F1, a brake B1 and a brake B2 that are disposed sequentially, in that order, from a radially inner side to a radially outer side. A counter drive gear 39 is connected to the carrier CR via a spline. A one-way clutch F2 is disposed in relation to the ring gear R2. A brake B3 is disposed between the outer periphery of the ring gear R2 and the case. The clutch section 35 includes a forward clutch C1 and a direct clutch C2. The forward clutch C1 is disposed in relation to the outer periphery of the ring gear R1. The direct clutch C2 is disposed between the inner periphery of a movable member (not shown) and a flange portion connected to a distal end of the hollow shaft.

A subsidiary shift mechanism 40 is disposed on a second shaft 43 that is disposed in parallel with the first shaft, i.e., the input shaft 37. The first and second shafts, together with a third shaft, in the form of differential shafts (left and right-side axles) 45l, 45r, form a triangular arrangement in a side view. The subsidiary shift mechanism 40 has simple planetary gear units 41, 42 in which a carrier CR3 and a ring gear R4 are firmly interconnected and sun gears S3, S4 are firmly interconnected so as to form a Simpson-type gear train. A ring gear R3 is connected to a counter driven gear 46 so as to form an input portion. The carrier CR3 and the ring gear R4 are connected to a speed-reducing gear 47 that forms an output section. An UD direct clutch C3 is disposed between the ring gear R3 and the integrated sun gear S3 (S4). The integrated sun gear S3 (S4) can be stopped by brake B4. Carrier CR4 can be stopped by brake B5. The subsidiary shift mechanism 40 is thereby able to provide three forward speed stages.

The differential device 50 forming the third shaft has a differential case 51 in which a gear 52, meshed with the speed-reducing gear 47, is fixed. The differential case 51 further houses differential gears 53 and left and right-side gears 55, 56 that are meshed with one another and are rotatably supported. The left and right-side axles 45l, 45r extend from the left and right-side gears. Therefore, rotation from the gear 52 is distributed in correspondence with load torques, and is transferred to the left and right front wheels via the left and right-side axles 45l, 45r.

Operation of the automatic shift mechanism 5 will now be described with reference to the operation table shown in FIG. 2(b). During a first (1st) speed state, the forward clutch C1, the one-way clutch F2 and the brake B5 are engaged. As a result, the main shift mechanism 30 assumes a first speed state, and the reduced-speed rotation is transferred to the ring gear R3 of the subsidiary shift mechanism 40 via the counter gears 39, 46. The subsidiary shift mechanism 40 is in a first speed state in which the carrier CR4 is stopped by the brake B5. Therefore, the reduced-speed rotation from the main shift mechanism 30 is further reduced in speed by the subsidiary shift mechanism 40, and is transferred to the left and right-side axles 45l, 45r via the gears 47, 52 and the differential device 50.

During a second (2nd) speed state, the brake B2 as well as the forward clutch C1 is engaged, and the engagement of the one-way clutch F2 is smoothly switched to the engagement of the one-way clutch F1. Thus, the main shift mechanism 30 assumes a second speed state. The subsidiary shift mechanism 40 is in the first speed state based on the engagement of the brake B5. The combination of the second speed state and the first speed state provides a second speed overall for the entire automatic shift mechanism 5.

For third (3rd) speed, the main shift mechanism 30 is in the same state as the above-described second speed state in which the forward clutch C1, the brake B2 and the one-way clutch F1 are engaged, and the brake B4 of the subsidiary shift mechanism 40 is engaged. Therefore, the sun gears S3, S4 are fixed, so that rotation from the ring gear R3 is output as a second-speed rotation from the carrier CR3. The combination of the second speed of the main shift mechanism 30 and the second speed of the subsidiary shift mechanism 40 provides a third speed overall for the entire automatic shift mechanism 5.

In fourth (4th) speed, the main shift mechanism 30 is in the same state as in the second and third speeds in which the forward clutch C1, the brake B2 and the one-way clutch F1 are engaged. In the subsidiary shift mechanism 40, the brake B is released and the UD direct clutch C3 is engaged. As a result, the ring gear R3 and the sun gear S3 (S4) are connected, so that the planetary gear units 41, 42 assume a locked-up rotation state wherein the gears rotate together. Thus, the combination of the second speed of the main shift mechanism 30 and the locked-up state (third speed) of the subsidiary shift mechanism 40 provides a fourth-speed overall for the entire automatic shift mechanism 5.

To establish fifth (5th) speed, the forward clutch C1 and the direct clutch C2 are engaged, so that rotation of the input shaft 37 is transferred to both the ring gear R1 and the sun gear S1. Thus, the main shift mechanism 30 assumes a locked-up state of rotation in which the planetary gear units 32, 33 of the gear section 31 turn together. The subsidiary shift mechanism 40 is in the locked-up state in which the UD direct clutch C3 is engaged. Thus, the combination of the third speed (locked-up state) of the main shift mechanism 30 and the third speed (locked-up state) of the subsidiary shift mechanism 40 provides a fifth-speed overall for the entire automatic shift mechanism 5.

To establish reverse (REV) drive state, the direct clutch C2 and the brake B3 are engaged and the brake B5 is also engaged. As a result, reverse rotation is extracted from the main shift mechanism 30. The subsidiary shift mechanism 40 is maintained in first speed state wherein the carrier CR4 is stopped by the brake B5. Thus, the combination of the reverse rotation of the main shift mechanism 30 and the first-speed rotation of the subsidiary shift mechanism 40 provides a speed-reduced reverse rotation.

In FIG. 2(b), the triangular symbols indicate engagement at the time of engine braking. That is, during the first speed, the brake B3 is engaged to fix the ring gear R2, as a substitute for the one-way clutch F2. During the second, third and fourth speeds, the brake B1 is engaged to fix the sun gear S2, as a substitute for the one-way clutch F1.

Figure 3:
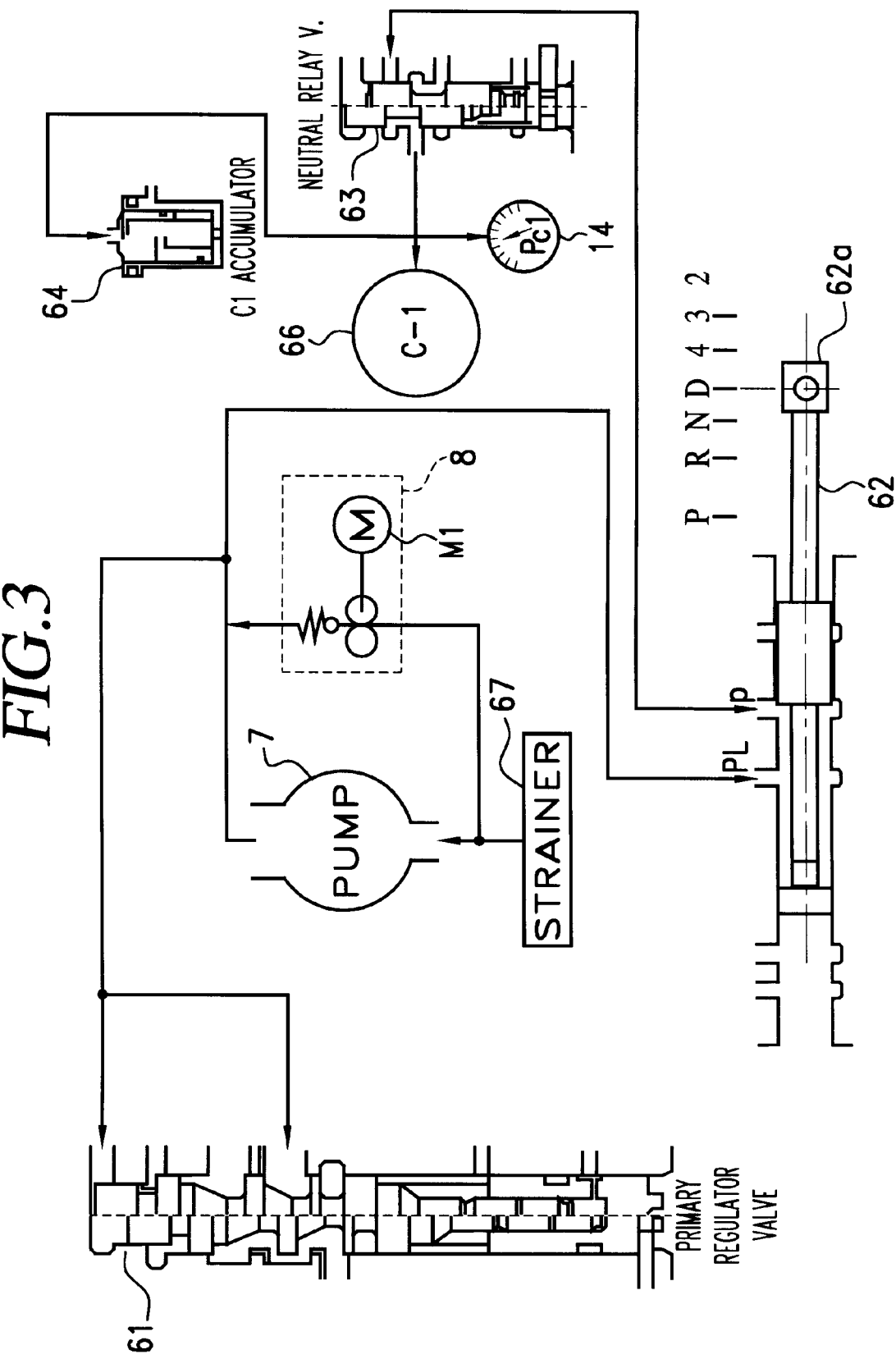
FIG. 3 is a partially schematic diagram illustrating a hydraulic circuit of the hydraulic control apparatus.

The hydraulic control apparatus 6 will now be described with reference to FIG. 3 which is a partial schematic diagram illustrating a hydraulic circuit of the hydraulic control apparatus 6. FIG. 3 shows only those elements needed in order to illustrate the invention, and the actual hydraulic circuit is more complicated, and has many more elements.

As indicated in FIG. 3, the mechanical oil pump 7 discharges automatic transmission fluid (hereinafter, referred to as "ATF") drawn in via a strainer 67 when gears and the like (not shown) are driven by the engine 2 and/or the motor-generator 3. The discharged ATF is supplied to a primary regulator valve 61, where the pressure of the ATF is adjusted to a line pressure. The line pressure is then supplied to a manual shift valve 62 and the like. The electric oil pump 8, indicated by a broken line in FIG. 3, sucks the ATF in via the strainer and discharges it when pump gears and the like are driven by an electric motor M1. The ATF discharge is supplied to the primary regulator valve 61, the manual shift valve 62, etc. That is, oil pressure can be supplied to the primary regulator valve 61 and the manual shift valve 62 by one or both of the mechanical oil pump 7 and the electric oil pump 8. It should be noted here that the primary regulator valve 61 is connected to a hydraulic circuit (not shown) so as to supply oil pressure to other valves and the like.

The manual shift valve 62 is connected in communication with a neutral relay valve 63 and supplies oil pressure thereto, for example, when a manual shift lever 62a is shifted to the drive (D) range. The neutral relay valve 63 is connected in communication with a clutch C1-adapted hydraulic actuator 66 and a clutch C1-adapted accumulator 64, and supplies oil pressures thereto so as to control the engagement of the clutch C1. An oil pressure sensor 14 and an oil temperature sensor 13 (not shown) described below are disposed in an oil passage connected to the clutch C1-adapted hydraulic actuator 66, so that the clutch oil pressure (oil pressure of the hydraulic control apparatus) $P_{C1}$ for engaging the clutch C1 and the temperature of the ATF can be detected.

Figure 4:
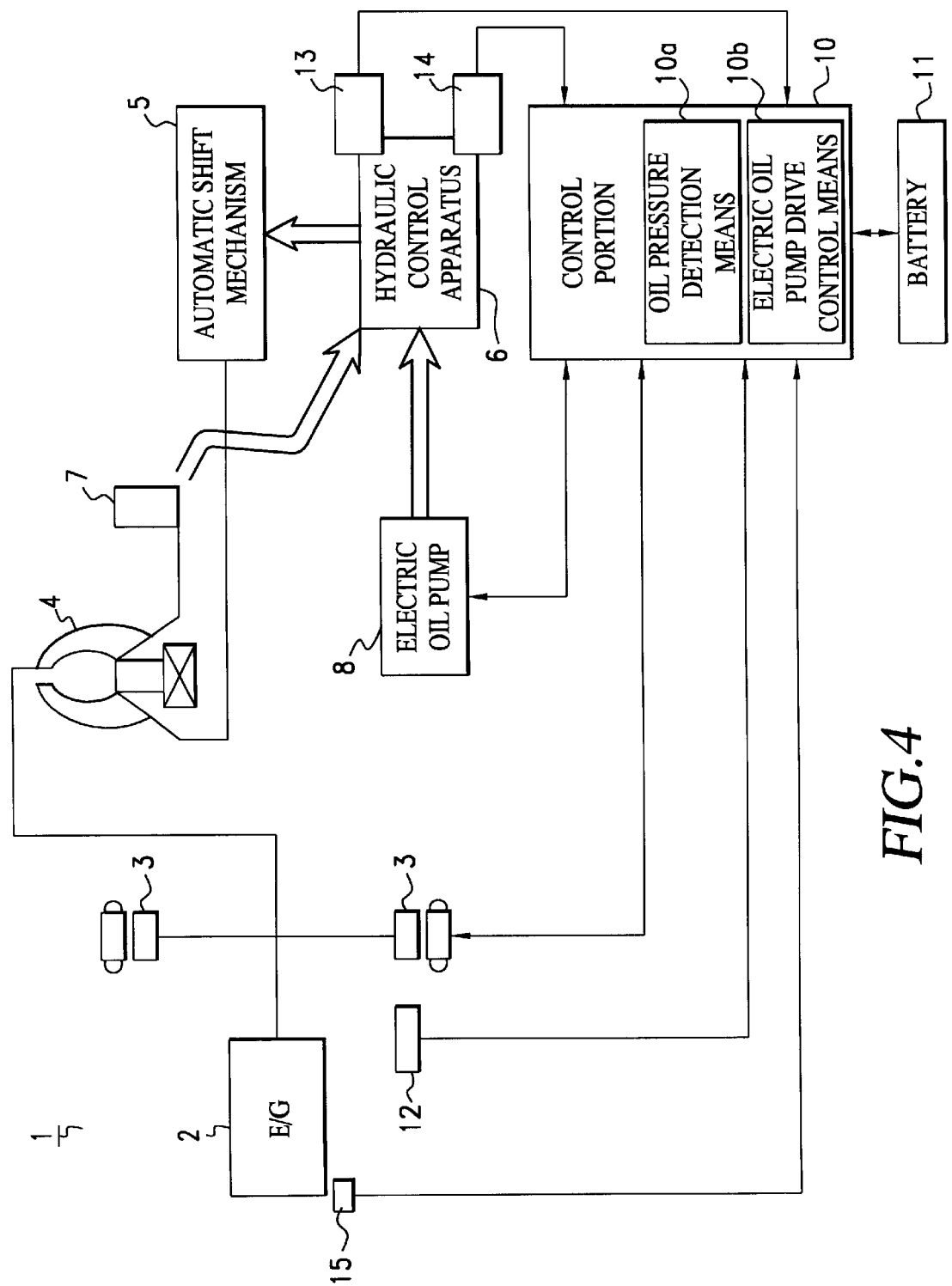
FIG. 4 is a block diagram illustrating an oil pump drive control apparatus in accordance with a first embodiment.

An oil pump drive control apparatus in accordance with the invention will next be described with reference to FIG. 4. FIG. 4 is a block diagram illustrating an oil pump drive control apparatus 1 in accordance with the invention. As shown in FIG. 4, the engine 2 and the motor-generator 3 are interconnected so that the motor-generator 3 can be driven by the engine 2, and the engine 2 can be driven by the motor-generator 3. Drive power can be output by driving one of the engine 2 and the motor-generator 3, or drive power can be output by driving both of them. The thus-generated drive power is input to the torque converter 4. The drive power input to the torque converter 4 is output to the automatic shift mechanism 5, whereby the drive power is changed in speed and then output to wheels (not shown). As described above, the mechanical oil pump 7 and the electric oil pump 8 are designed so as to supply oil pressure to the hydraulic control apparatus 6 provided in the automatic shift mechanism 5. The hydraulic control apparatus 6 is provided with the oil temperature sensor 13 and the oil pressure sensor 14.

The oil pump drive control apparatus 1 has an electric controller or "control section" 10. The controller 10 is connected to the motor-generator 3, the electric oil pump 8 and a battery 11 so that the controller 10 can output signals to and can receive signals from the motor-generator 3, the electric oil pump 8 and the battery 11. Thus, the controller 10 is able to detect states of these components and to control the components. The controller 10 is connected to a rotational speed sensor (drive power source state detecting means) 15 for detecting the rotational speed of the engine 2, a magnetic pole position detecting sensor (drive power source state detecting means) 12 for detecting the rotational speed of the motor-generator 3, the oil temperature sensor 13, and the oil pressure sensor 14. The controller 10 has oil pressure detection means 10a for detecting the clutch oil pressure $P_{C1}$ supplied to the clutch C1 of the hydraulic control apparatus 6, based on results of detection of various sensors, and an electric oil pump drive control means 10b for driving or stopping the electric oil pump 8 based on results of detection of the oil pressure detection means 10a. Furthermore, the controller 10 detects the driving and stopping of the drive power sources (the engine 2 and the motor-generator 3) through the use of the rotational speed sensor 15 and the magnetic pole position detection sensor 12, and switches on and off a drive power source stop flag (described below) based on stopping or the driving of the drive power sources.

Figure 5:
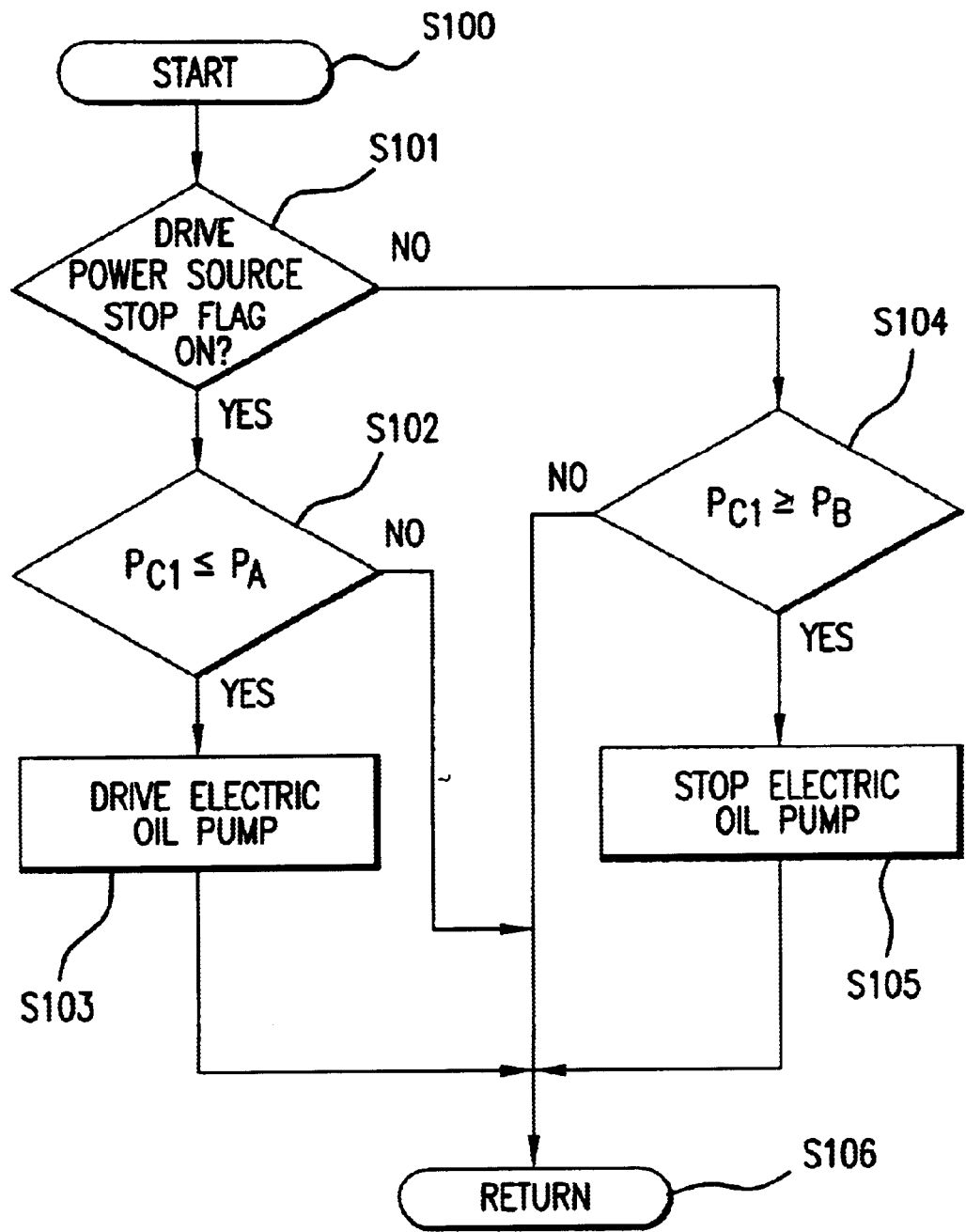
FIG. 5 is a flowchart illustrating a control of the oil pump drive control apparatus in accordance with the invention.

Control of the oil pump drive control apparatus 1 in accordance with the invention will next be described with reference to FIG. 5. FIG. 5 is a flowchart illustrating a control scheme for the oil pump drive control apparatus 1 in accordance with the invention. When the drive power source stop flag mentioned in FIG. 5 is "OFF", this indicates that one of the oil pump drive control apparatus 1 and the motor-generator 3 (or both of them) is driven, and an "ON" indicates that both the engine 2 and the motor-generator 3 are stopped. Furthermore, the control routine is started (S100), for example, when a driver turns on the ignition switch by using an ignition key (not shown). The control routine is continuously executed, for example, until the ignition switch is turned off.

First, the controller 10 determines whether the drive power source stop flag is ON, based on, for example, the degree of throttle opening (S101). For example, during a normal running state of the vehicle, one of the engine 2 and the motor-generator 3 is driven (or both of them are driven), so that it is determined that the drive power source stop flag is not ON. In response, the clutch oil pressure $P_{C1}$ is detected by the oil pressure sensor 14, and the controller 10 determines whether the clutch oil pressure $P_{C1}$ is greater than or equal to a second predetermined threshold value $P_B$ (S104). When one of the engine 2 and the motor-generator 3 is driven, oil pressure is supplied by the mechanical oil pump 7, so that the clutch oil pressure $P_{C1}$ is greater than or equal to the second predetermined threshold value $P_B$. Therefore, while the electric oil pump 8 is stopped (S105), the process returns (S106). In this embodiment, since the clutch oil pressure $P_{C1}$ is detected by the oil pressure sensor 14, it is possible to accurately detect the oil pressure supplied to the clutch C1 engaged at the time of, for example, starting the vehicle. Therefore, it is possible to maintain an oil pressure needed for engagement of the clutch C1, particularly, at the time of starting the vehicle. Furthermore, it is possible to detect the clutch oil pressure $P_{C1}$ regardless of, for example, changes in the temperature of ATF (described in detail below).

If both the engine 2 and the motor-generator 3 are stopped based on the degree of throttle opening, the controller 10 determines that the drive power source stop flag is ON (S101), and then determines whether the clutch oil pressure $P_{C1}$ is less than or equal to a first predetermined threshold value $P_A$ (S102). Immediately after the engine 2 or the motor-generator 3 is stopped, the rotational speed of the engine 2 or the motor-generator 3 gradually decreases, so that the mechanical oil pump 7 is gradually stopped, that is, the oil pressure of the mechanical oil pump 7 gradually decreases. Therefore, immediately after the engine 2 or the motor-generator 3 is stopped, the clutch oil pressure $P_{C1}$ is greater than or equal to the first predetermined threshold value $P_A$, so that the control routine returns (S106) while the electric oil pump 8 is in the stopped state. While steps S100, S101, S102 and S106 are repeated, the clutch oil pressure $P_{C1}$ decreases to or below the first predetermined threshold value $P_A$, which is detected in step S102. Then, the electric oil pump 8 is driven (S103), so that oil pressure is supplied to the hydraulic control apparatus 6 by the electric oil pump 8.

After that, if the engine 2 or the motor-generator 3 is driven, the controller 10 determines that the drive power source stop flag is not ON (S101), and determines whether the clutch oil pressure $P_{C1}$ is greater than or equal to the second predetermined threshold value $P_B$ (S104). Since the second predetermined threshold value $P_B$ is preset at a value that is greater than the first predetermined threshold value $P_A$ (described in detail below), it is determined that the clutch oil pressure $P_{C1}$ is less than or equal to the second predetermined threshold value $P_B$. Therefore, the driven state of the electric oil pump 8 is maintained, and the routine returns (S106). Hence, even when the vehicle is stopped, i.e., the drive power source (the engine 2 and the motor-generator 3) is stopped (turned off), a predetermined oil pressure is generated in the hydraulic control apparatus 6 of the automatic shift mechanism 5 by the electric oil pump 8. If from this stopped state, the vehicle is started, the automatic transmission, including the torque converter 4, the clutch C1, etc., functions normally. Therefore, the vehicle can be started without any impediment. Then, the mechanical oil pump 7 is driven because the engine 2 or the motor-generator 3 is driven. In response, the clutch oil pressure $P_{C1}$ rises. Then, when the clutch oil pressure $P_{C1}$ becomes equal to or greater than the second predetermined threshold value $P_B$ (S104), the electric oil pump 8 is stopped (S105), and the routine returns (S106). Thus, the aforementioned normal running state of the vehicle is recovered.

Figure 6A:
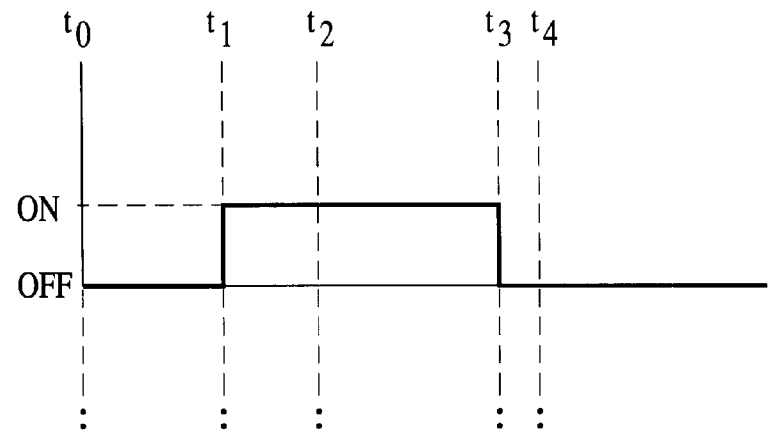
Figure 6B:
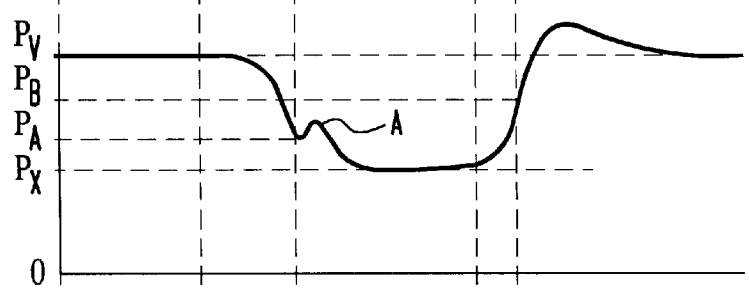
Figure 6C:
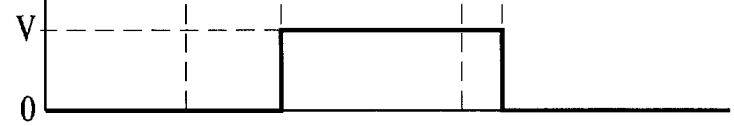

The aforementioned control will be further described with reference to FIGS. 5 and 6a–6c. FIGS. 6a–6c are diagrams illustrating the control of the oil pump drive control apparatus 1 in accordance with the present invention. More specifically, FIG. 6(a) is a time chart indicating the drive power source stop flag, FIG. 6(b) is a time chart indicating the clutch oil pressure, and FIG. 6(c) is a time chart indicating the voltage of the electric oil pump.

As indicated in FIGS. 6(a) to 6(c), when the drive power source stop flag is OFF at a point in time t0, one of the engine 2 and the motor-generator 3 (or both of them) is being driven (S101), and therefore, the mechanical oil pump 7 is being driven, so that the clutch oil pressure $P_{C1}$ supplied to the oil pressure control apparatus of the automatic transmission is kept at a substantially constant oil pressure $P_Y$ that is greater than the second predetermined threshold value $P_B$ (S104). At this moment, the voltage of the electric oil pump 8 is "0", that is, the electric oil pump 8 is stopped (S105).

At time t1, when both the engine 2 and the motor-generator 3 are stopped and the drive power source stop flag is turned ON (S101), the mechanical oil pump 7 is also stopped. However, since sufficient oil pressure remains provided by the mechanical oil pump 7 as described above, the clutch oil pressure $P_{C1}$ is kept at or above the first predetermined threshold value $P_A$ (S102). Then, the clutch oil pressure $P_{C1}$ gradually decreases because the mechanical oil pump 7 and the electric oil pump 8 are controlled so as to stop. At time t2, the clutch oil pressure $P_{C1}$ becomes equal to or less than the first predetermined threshold value $P_A$ (S102). The electric oil pump 8 receives voltage V, and the electric oil pump 8 is driven (S103).

In this case, oil pressure is supplied by the electric oil pump 8, so that the clutch oil pressure $P_{C1}$ temporarily rises due to the remaining oil pressure caused by the mechanical oil pump 7. However, since the second predetermined threshold value $P_B$ is preset at a predetermined value that is greater than the first predetermined threshold value $P_A$ (i.e., a value that is different from the first predetermined threshold value $P_A$ by a predetermined amount), a maximum value A does not exceed the second predetermined threshold value $P_B$. Therefore, it is possible to prevent occurrence of what is generally termed "hunting" in which the electric oil pump 8 is erroneously stopped and started again. Furthermore, even if the first predetermined threshold value $P_A$ and the second predetermined threshold value $P_B$ are set equal to each other, the electric oil pump 8 is driven based on the first predetermined threshold value $P_A$ when the drive power source stop flag is ON (a state where stoppage (off) of the drive power source has been detected). When the drive power source stop flag is OFF (a state where operation of the drive power source is detected), the electric oil pump 8 is stopped based on the second predetermined threshold value $P_B$. Therefore, it is possible to prevent erroneous stoppage of the electric oil pump 8 when the drive power source has been stopped and to prevent the electric oil pump 8 from being erroneously driven when the drive power source is being driven. That is, it is possible to prevent "hunting".

Thereafter, the residual oil pressure provided by the mechanical oil pump 7 disappears, so that the clutch oil pressure $P_{C1}$ is only the oil pressure supplied by the electric oil pump 8. However, the clutch oil pressure $P_{C1}$ is still kept at a substantially constant oil pressure $P_X$ that is needed for the hydraulic control of the automatic transmission. For example, if the electric oil pump 8 is driven after the oil pressure remaining in the mechanical oil pump 7 disappears, the clutch oil pressure $P_{C1}$ becomes lower than the oil pressure $P_X$ needed for the hydraulic control. Therefore, the first predetermined threshold value $P_A$ is preset at such a predetermined value that the clutch oil pressure $P_{C1}$ can be kept at or above the oil pressure $P_X$.

The first predetermined threshold value $P_A$ is preset such that the electric oil pump 8 is driven after the oil pressure from the mechanical oil pump 7 becomes low. Therefore, the electric oil pump 8 can be driven without a working load. Hence, the working load on the electric oil pump 8 can be reduced. Consequently, it becomes possible to prevent increased electric power consumption, to prevent reduced operation time due to a low charge, and to retain durability and the like. It also becomes possible to reduce the size of the electric oil pump 8. Furthermore, the reduced power consumption will improve the fuel economy, particularly in hybrid vehicles.

At time t3 when one of the engine 2 and the motor-generator 3 (or both of them) is driven, the mechanical oil pump 7 is driven and the drive power source stop flag is turned OFF (S101). Although the mechanical oil pump 7 is driven, the rising of the clutch oil pressure $P_{C1}$ caused by the mechanical oil pump 7 is delayed by a predetermined time due to resistance in the hydraulic circuit and the like. During the delay, the driving of the electric oil pump 8 is maintained, so that a predetermined oil pressure is secured. Due to the driving of the electric oil pump 8 as well, the clutch oil pressure $P_{C1}$ rises above the oil pressure $P_X$, but does not reach the second predetermined threshold value $P_B$ (S104). Therefore, the driving of the electric oil pump 8 is continued. After the predetermined delay time has elapsed, the oil pressure produced by the mechanical oil pump 7 rises. At a time t4 when the clutch oil pressure $P_{C1}$ rises to or above the second predetermined threshold value $P_B$ (S104), the electric oil pump 8 is stopped (S105), so that the oil pressure is supplied by the mechanical oil pump 7, that is, the normal running state is established.

If in this case, the drive power source is stopped and the driving of the electric oil pump 8 is stopped, there occurs a danger of the clutch oil pressure $P_{C1}$ becoming lower than the oil pressure $P_X$ needed for the hydraulic control of the automatic transmission. If the electric oil pump 8 is stopped after the oil pressure provided by the mechanical oil pump 7 becomes sufficiently high, the load on the electric oil pump 8 increases while both the mechanical oil pump 7 and the electric oil pump 8 are being driven. As a result, there occur problems of increased electric power consumption, reduced operation time due to a reduced amount of charge stored, reduced durability, etc. If the electric oil pump 8 is designed so as to withstand the load, the problem of size increase arises.

Therefore, by setting the second predetermined threshold value $P_B$ at a value that is lower than the oil pressure $P_Y$ and that allows the needed oil pressure $P_X$ to be secured, the electric oil pump 8 can be stopped when the oil pressure provided by the mechanical oil pump 7 rises to such a level that the oil pressure $P_X$ can be maintained. Hence, it becomes possible to prevent the clutch oil pressure $P_{C1}$ from becoming lower than the minimum oil pressure $P_X$ needed at the time of starting the vehicle, and also to reduce the operation load of the electric oil pump 8. Therefore, not only are the aforementioned problems solved, but also the electric oil pump 8 can be reduced in size.

Second Embodiment

A second embodiment that is a modification of the first embodiment will be described with reference to the drawings. Portions of the second embodiment different from the first embodiment will be described below, but portions equivalent to those of the first embodiment will not be described again.

As described above, the mechanical oil pump 7 is driven by the engine 2, the motor-generator 3 and the torque converter 4. Therefore, for example, even if the hydraulic control apparatus 6 of the automatic transmission is not provided with an oil pressure sensor 14, the rotational speed of the engine 2 or the motor-generator 3 (hereinafter, referred to as "drive power source rotational speed") N, corresponding to the first and second threshold values in the first embodiment, can be determined by considering the oil temperature based on the drive power source rotational speed N and the clutch oil pressure $P_{C1}$ supplied by the mechanical oil pump 7 and the electric oil pump 8. The electric oil pump drive control means 10b controls driving and stopping of the electric oil pump 8 based on the drive power source rotational speed N.

Figure 7:
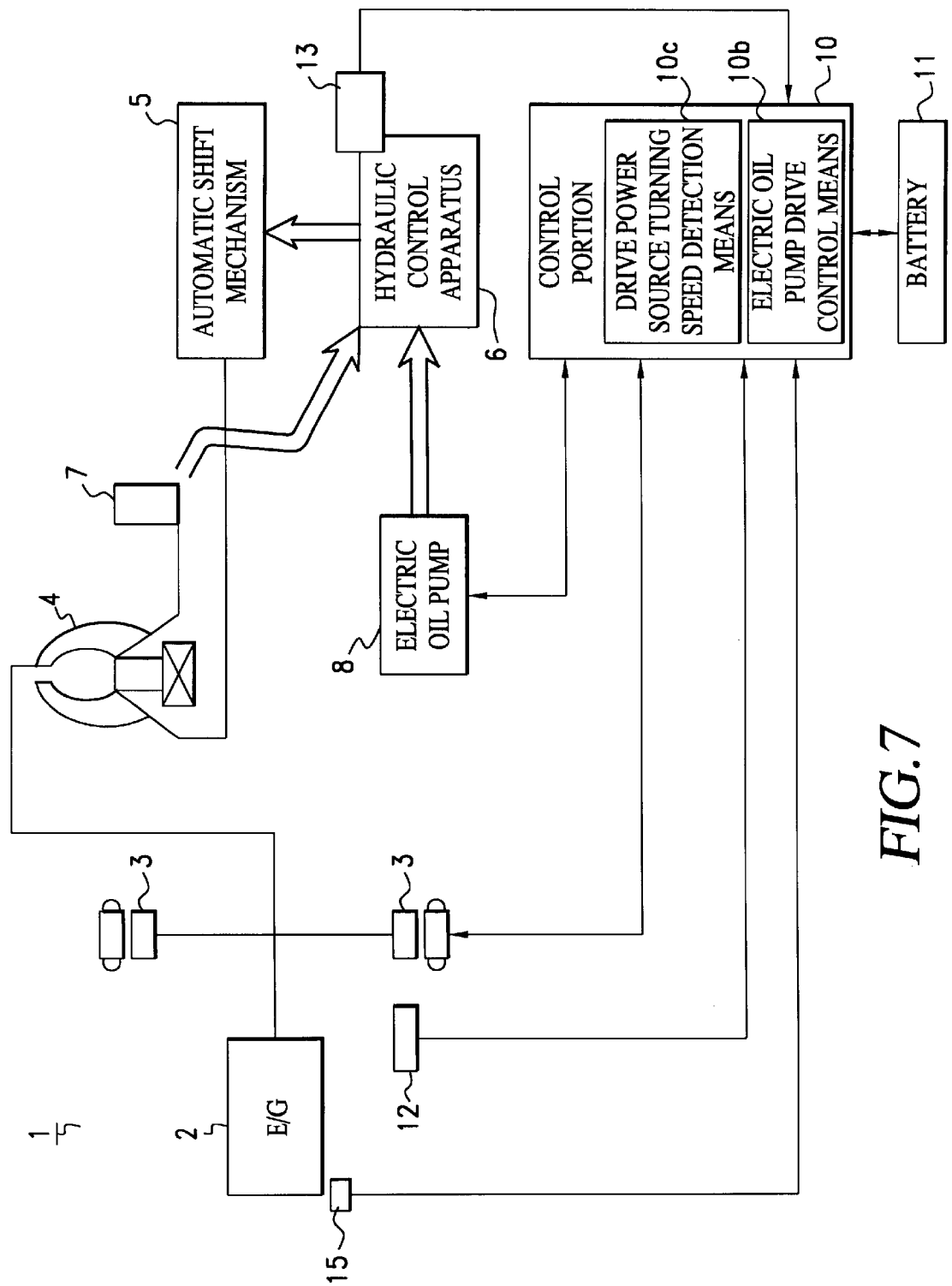
FIG. 7 is a block diagram illustrating an oil pump drive control apparatus in accordance with a second embodiment.

An oil pump drive control apparatus 1' in accordance with the second embodiment will be described with reference to the block diagram of FIG. 7. As illustrated in FIG. 7, the engine 2 and the motor-generator 3 are interconnected so that the motor-generator 3 can be driven by the engine 2, and the engine 2 can be driven by the motor-generator 3. This arrangement allows drive power to be output by driving one of the engine 2 and the motor-generator 3, or drive power can be output by driving both of them so that they apply drive power to each other. The thus-generated drive power is input to the torque converter 4. The drive power input to the torque converter 4 is then input to the automatic shift mechanism 5, whereby the drive power is changed in speed and is output to the wheels (not shown). As described above, the mechanical oil pump 7 and the electric oil pump 8 are designed so as to supply oil pressure to the hydraulic control apparatus 6 provided in the automatic shift mechanism 5 and provided with the oil temperature sensor 13.

The oil pump drive control apparatus 1' has a controller (ECU) 10. The controller 10 is connected to the motor-generator 3, the electric oil pump 8 and a battery 11 so that the controller 10 can output signals to and receive signals from the motor-generator 3, the electric oil pump 8 and the battery 11. Thus, the controller is able to detect states of these components and to control the components. The controller 10 is connected to a rotational speed sensor 15 for detecting the rotational speed of the engine 2, a magnetic pole position detecting sensor 12 for detecting the rotational speed of the motor-generator 3, and the oil temperature sensor 13. The control portion 10 has a drive power source rotational speed detection means 10c for detecting the drive power source rotational speed N based on detection results provided by the various sensors, and an electric oil pump drive control means 10b for driving or stopping the electric oil pump 8. Furthermore, the controller 10 detects the driving and stopping of the drive power sources (the engine 2 and the motor-generator 3) through the use of the rotational speed sensor 15 and the magnetic pole position detection sensor 12, and switches ON and OFF a drive power source stop flag (described below) based on the stopping or the driving of the drive power sources.

Figure 8A:
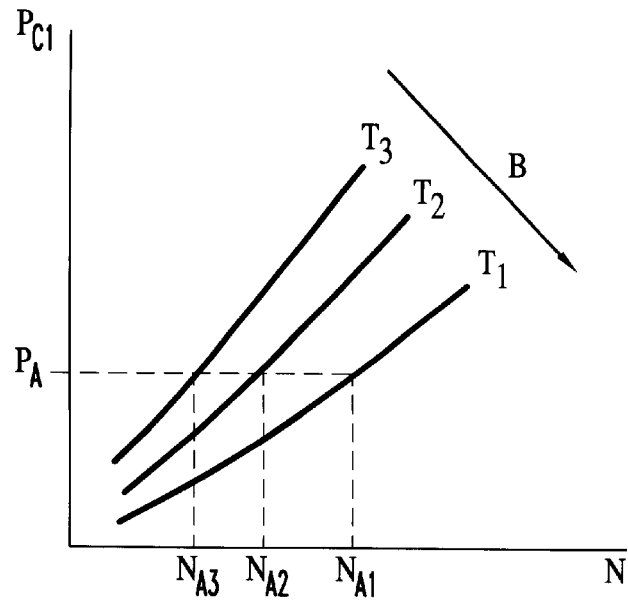
Figure 8B:
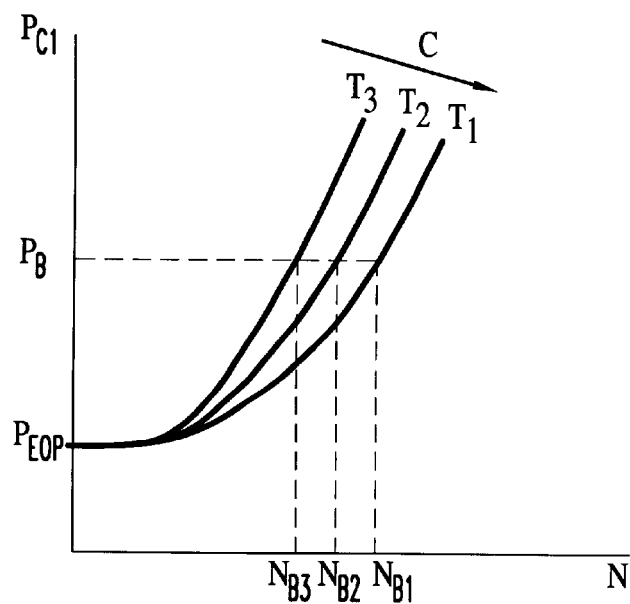

The relationship between the oil temperature and the drive power source rotational speed will next be described with reference to FIGS. 8(a) and 8(b). FIG. 8(a) is a diagram indicating the first predetermined threshold value. FIG. 8(b)

is a diagram indicating the second predetermined threshold value. As indicated in FIG. 8(a), the clutch oil pressure $P_{C1}$ increases with increase in the drive power source rotational speed N. The clutch oil pressure $P_{C1}$ becomes equal to the first predetermined threshold value $P_A$ at the time of a drive power source rotational speed $N_{A1}$ in the case of the ATF temperature $T_1$, at a drive power source rotational speed $N_{A2}$ in the case of the ATF temperature $T_2$, and at a drive power source rotational speed $N_{A3}$ in the case of the ATF temperature $T_3$. That is, a first predetermined rotational speed threshold value $N_A$ corresponding to the first predetermined threshold value $P_A$ can be determined based on the temperature T of the ATF.

Furthermore, in the cases of ATF temperatures $T_1$, $T_2$ and $T_3$, for example, the clutch oil pressure $P_{C1}$ increases with increases in the drive power source rotational speed N as indicated in FIG. 8(b). The clutch oil pressure $P_{C1}$ becomes equal to the second predetermined threshold value $P_B$ when the drive power source rotational speed is $N_{B1}$ in the case of the ATF temperature $T_1$, when the drive power source rotational speed is $N_{B2}$ in the case of the ATF temperature $T_2$, and when the drive power source rotational speed is $N_{B3}$ in the case of the ATF temperature $T_3$. That is, a second predetermined rotational speed threshold value $N_B$, corresponding to the second predetermined threshold value $P_B$, can be determined based on the temperature T of the ATF.

In FIGS. 8(a) and 8(b), the arrows B and C indicate a direction of increase in the ATF temperature, that is, the ATF temperatures $T_3$, $T_2$, $T_1$ represent sequentially increased temperatures of the ATF. Furthermore, in FIG. 8(b), the oil pressure $P_{EOP}$ is the oil pressure supplied by the electric oil pump 8. The relationship between the drive power source rotational speed N and the clutch oil pressure $P_{C1}$ indicated in FIG. 8(b) indicates that the oil pressure of the electric oil pump 8 and the oil pressure of the mechanical oil pump 7 increase together.

The control of the oil pump drive control apparatus 1' in accordance with the second embodiment will be now described with reference to the flowchart of FIG. 9 and the diagrams of FIGS. 10(a)–10(d). When the control routine is started (S200), the controller detects the drive power source rotational speed N via the magnetic pole position detection sensor 12 and the rotational speed sensor 15, and detects the temperature T of the ATF via the oil temperature sensor 13. A relationship between the drive power source rotational speed N and the clutch oil pressure $P_{C1}$ based on the ATF temperature T, as indicated in FIGS. 8(a) and 8(b) for example, is pre-stored in the controller 10. Therefore, the controller 10 is able to calculate the drive power source rotational speed N for driving or stopping the electric oil pump 8 from the needed oil pressure $P_X$ and the ATF temperature T.

Figure 10A:
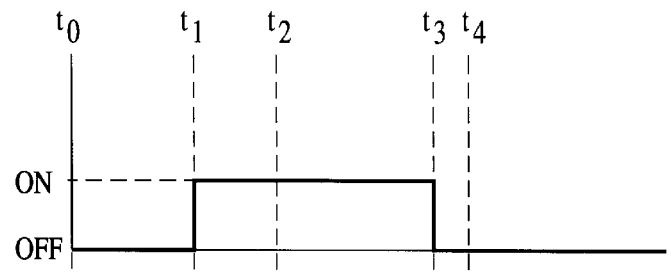
Figure 10B:
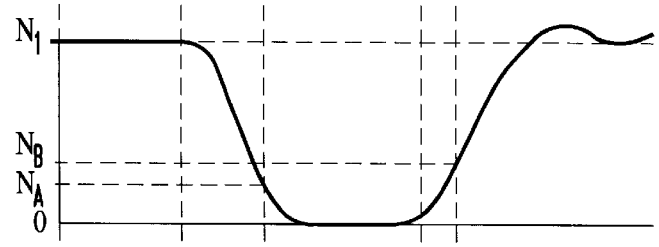
Figure 10C:
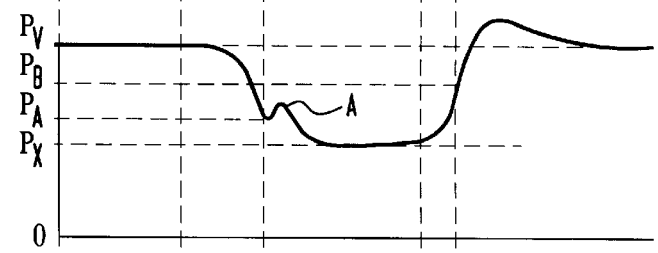
Figure 10D:
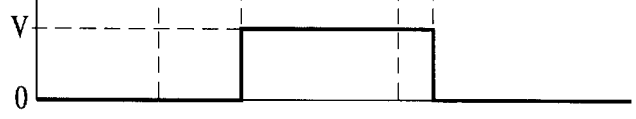

As indicated in FIGS. 10(a)–10(d), if the drive power source stop flag is OFF at time t0, one of the engine 2 and the motor-generator 3 (or both of them) is being driven (S201), and therefore, the mechanical oil pump 7 is being driven. The clutch oil pressure $P_{C1}$ supplied to the oil pressure control apparatus of the automatic transmission is kept at a substantially constant drive power source rotational speed N1 that is greater than the second predetermined rotational speed threshold value $N_B$ (S204), as indicated in FIG. 10(b). In this state, the clutch oil pressure $P_{C1}$ is kept at a substantially constant oil pressure $P_Y$ that is greater than the second predetermined threshold value $P_B$, as indicated in FIG. 10(c). Therefore, the electric oil pump 8 is stopped (S205), and the value of voltage to the electric oil pump 8 is "0" as indicated in FIG. 10(d).

At time t1 when both the engine 2 and the motor-generator 3 are stopped, the drive power source stop flag is turned ON as indicated in FIG. 10(a), so that it is determined that the drive power source stop flag is ON in step S201. The drive power source rotational speed N, that is, the rotational speed of the engine 2 or of the motor-generator 3, gradually decreases, and is therefore greater than or equal to the first predetermined rotational speed threshold value $N_A$ as indicated in FIG. 10(b) (S202). Therefore, the oil pressure provided by the mechanical oil pump 7 remains sufficiently high, so that the clutch oil pressure $P_{C1}$ is kept at or above the first predetermined threshold value $P_A$ as indicated in FIG. 10(c). Since both the engine 2 and the motor-generator 3 are brought to a stop (turned off), the drive power source rotational speed N gradually decreases to or below the first predetermined rotational speed threshold value $N_A$ at time t2 (S202). The clutch oil pressure $P_{C1}$ also gradually decreases to or below the first predetermined threshold value $P_A$. Therefore, at time t2, the electric oil pump 8 receives voltage V, and is thereby driven (S203).

In this case, oil pressure is supplied by the electric oil pump 8 similarly to the case of the first embodiment, so that the clutch oil pressure $P_{C1}$ temporarily rises due to the remaining oil pressure produced by the mechanical oil pump 7, as well. However, since the second predetermined rotational speed threshold value $N_B$ is preset at a predetermined value that is greater than the first predetermined rotational speed threshold value $N_A$, the drive power source rotational speed N corresponding to a maximum value A does not exceed the second predetermined rotational speed threshold value $N_B$. Therefore, it is possible to prevent occurrence of "hunting" in which the electric oil pump 8 is erroneously stopped and started again. Furthermore, even if the first predetermined rotational speed threshold value $N_A$ and the second predetermined rotational speed threshold value $N_B$ are set equal to each other, the electric oil pump 8 is driven based on the first predetermined rotational speed threshold value $N_A$ when the drive power source stop flag is ON (a state where the stoppage of the drive power source has been detected). When the drive power source stop flag is OFF (a state where the driving of the drive power source has been detected), the electric oil pump 8 is stopped based on the second predetermined rotational speed threshold value $N_B$. Therefore, it is possible to prevent the electric oil pump 8 from being erroneously stopped when the drive power source is stopped, and to prevent the electric oil pump 8 from being erroneously driven when the drive power source is being driven. That is, it is possible to prevent "hunting."

Subsequently, when the drive power source rotational speed N becomes "0", the residual oil pressure provided by the mechanical oil pump 7 disappears, so that the clutch oil pressure $P_{C1}$ is only the oil pressure supplied by the electric oil pump 8. However, the clutch oil pressure $P_{C1}$ is still kept at a substantially constant oil pressure $P_X$ that is needed for the hydraulic control of the automatic transmission. For example, if the electric oil pump 8 is driven after the oil pressure from the mechanical oil pump 7 disappears, the clutch oil pressure $P_{C1}$ becomes lower than the oil pressure $P_X$ needed for the hydraulic control. Therefore, the first predetermined rotational speed threshold value $N_A$ is preset at such a predetermined value that the clutch oil pressure $P_{C1}$ can be kept at or above the oil pressure $P_X$.

The first predetermined rotational speed threshold value $N_A$ is preset such that the electric oil pump 8 is driven after the oil pressure remaining from the mechanical oil pump 7 becomes sufficiently low. Therefore, the electric oil pump 8 can be driven without a working load. Hence, the working load on the electric oil pump 8 can be reduced. Consequently, it becomes possible to prevent an increase in electric power consumption, to prevent reduced operation time due to a reduced amount of charge, and to prevent reduction in durability and the like. It also becomes possible to reduce the size of the electric oil pump 8. Furthermore, the reduced power consumption improves fuel economy, particularly in hybrid vehicles.

At time t3 when one of the engine 2 and the motor-generator 3 (or both of them) is driven, the mechanical oil pump 7 is driven and the drive power source stop flag is turned OFF (S101) as indicated in FIG. 10(*a*). Then, the drive power source rotational speed N gradually increases as indicated in FIG. 10(*b*), and the clutch oil pressure $P_{C1}$ rises from the oil pressure $P_X$ derived from both the mechanical oil pump 7 and the electric oil pump 8. However, since the drive power source rotational speed N is less than or equal to the second predetermined rotational speed threshold value $N_B$ (S204), that is, since the clutch oil pressure $P_{C1}$ has not reached the second predetermined threshold value $P_B$, the driving of the electric oil pump 8 is continued. In this case, due to the oil pressure from the electric oil pump 8, the automatic transmission functions normally, so that the vehicle can be started in motion without an impediment. After a predetermined time has elapsed, the oil pressure from the mechanical oil pump 7 rises. At time t4, when the drive power source rotational speed N rises to or above the second predetermined rotational speed threshold value $N_B$ (S204) and the clutch oil pressure $P_{C1}$ becomes equal to or greater than the second predetermined threshold value $P_B$, the electric oil pump 8 is stopped (S205), so that the oil pressure is supplied by the mechanical oil pump 7, that is, the normal running state is established.

For example, if in this case the drive power source is stopped and the driving of the electric oil pump 8 is stopped, there occurs a danger that the clutch oil pressure $P_{C1}$ might become lower than the oil pressure $P_X$ needed for the hydraulic control of the automatic transmission, similarly to the case of the first embodiment. If the electric oil pump 8 is stopped after the oil pressure provided by the mechanical oil pump 7 becomes sufficiently high, the load on the electric oil pump 8 increases while both the mechanical oil pump 7 and the electric oil pump 8 are being driven. As a result, there occur problems of increased electric power consumption, reduced operation time due to reduced amount of charge stored, reduced durability, etc. If the electric oil pump 8 is designed in accordance with the load, a problem of size increase is also created.

Therefore, by setting the second predetermined rotational speed threshold value $N_B$ at a rotational speed that is lower than the drive power source rotational speed N corresponding to the oil pressure $P_Y$ and that allows the needed oil pressure $P_X$ to be secured, it become possible to stop the electric oil pump 8 when the oil pressure provided by the mechanical oil pump 7 rises to such a level that the needed oil pressure $P_X$ can be maintained. Hence, on the basis of the drive power source rotational speed N, it becomes possible to prevent the clutch oil pressure $P_{C1}$ from becoming lower than the minimum oil pressure $P_X$ needed at the time of starting the vehicle, and also to reduce the operation load on the electric oil pump 8. Therefore, while the aforementioned problems are solved, the electric oil pump 8 can also be reduced in size.

Although in the first and second embodiments, the oil pump drive control apparatus of the invention is applied to a hybrid vehicle whose drive power source is an engine and a motor-generator, the oil pump drive control apparatus of the invention may also be applied to an idling-stop type vehicle whose drive power source is only an engine. The invention is applicable to any vehicle in which a drive power source is stopped (turned off).

Furthermore, although in the second embodiment, the first and second predetermined rotational speed threshold values are set in accordance with the relationship between the drive power source rotational speed N and the clutch oil pressure $P_{C1}$ based on changes in the ATF temperature T (see FIGS. 8(*a*) and 8(*b*)), any arrangement is appropriate if the setting is made for a case where the ATF temperature T is at the highest temperature (e.g., if the ATF temperature is $T_1$). That is, it is possible to fix the first and second predetermined rotational speed threshold values to maximum values (e.g., $N_{A1}$, $N_{B1}$) corresponding to changes in the temperature of the ATF so as to include a case where the ATF temperature T is low (e.g., a case where the ATF temperature is $T_2$ or $T_3$ and the first and second predetermined rotational speed threshold values are $N_{A2}$, $N_{B2}$ or $N_{A3}$, $N_{B3}$).

While the present invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. An oil pump drive control apparatus for a vehicle comprising:

a drive power source for running the vehicle;

a first oil pump driven by said drive power source;

a second oil pump driven independently of said drive power source;

a hydraulic controller which receives an oil pressure generated by said first oil pump and said second oil pump and which performs a speed shift by hydraulically controlling a plurality of friction engagement elements of an automatic transmission of the vehicle;

detection means for detecting, as a control parameter, at least one of oil pressure output by said hydraulic controller apparatus; and a rotation speed of said drive power source; and oil pump drive control means for driving said second oil pump so as to maintain an oil pressure needed for the hydraulic control of the friction engagement elements when the detected control parameter is less than or equal to a first predetermined threshold value and for stopping said second oil pump when the detected control parameter is greater than or equal to a second predetermined threshold value that is different from the first predetermined threshold value.

2. An oil pump drive control apparatus according to claim 1, wherein said drive power source includes an engine and an electric motor which supply drive power to an input shaft of the automatic transmission, and wherein the vehicle is a hybrid vehicle in which said engine and said electric motor are drivable and stoppable in accordance with a running condition of the vehicle.

3. An oil pump drive control apparatus according to claim 1 wherein said detection means is an oil pressure detection means and said control parameter is oil pressure output by said hydraulic controller apparatus.

4. An oil pump drive control apparatus according to claim 3, wherein said oil pressure detection means detects an oil pressure supplied to a friction engagement element that transfers drive power from said drive power source to a speed shift mechanism of the automatic transmission.

5. An oil pump drive control apparatus according to claim 3, further comprising:

state-of-drive power source detection means for detecting a driving state or a stopped state of said drive power source; and wherein said oil pump drive control means drives said second oil pump responsive to detection of an oil pressure by said oil pressure detection means which is less than or equal to the first predetermined threshold value while the stopped state of said drive power source is detected by said state-of-drive power source detection means, and said oil pump drive control means stops said second oil pump responsive to detection of an oil pressure by said oil pressure detection means which is greater than or equal to the second predetermined threshold value while the driving state of said drive power source is detected by said state-of-drive power source detection means.

6. An oil pump drive control apparatus according to claim 1, further comprising a battery and an electric motor powered by said battery, independently of said drive power source, for driving said second oil pump.

7. An oil pump drive control apparatus according to claim 6 wherein said drive power source includes an engine and a motor-generator.

8. An oil pump drive control apparatus of a vehicle comprising:

a drive power source for running the vehicle;

a first oil pump driven by said drive power source;

a second oil pump driven independently of said drive power source;

a hydraulic controller which receives an oil pressure generated by said first oil pump and an oil pressure generated by said second oil pump and which performs a speed shift by hydraulically controlling a plurality of friction engagement elements in an automatic transmission of the vehicle;

drive power source rotational speed detection means for detecting a rotational speed of said drive power source; and oil pump drive control means for driving said second oil pump so as to maintain an oil pressure needed for the hydraulic control of the friction engagement elements when the detected rotational speed of said drive power source is less than or equal to a first predetermined threshold value and for stopping said second oil pump when the detected rotational speed of the power drive source is greater than or equal to a second predetermined threshold value that is different from the first predetermined threshold value.

9. An oil pump drive control apparatus according to claim 8, further comprising:

state-of-drive power source detection means for detecting a driving state or a stopped state of said drive power source; and wherein said oil pump drive control means drives said second oil pump responsive to detection of a rotational speed by said drive power source rotational speed detection means which is less than or equal to the first predetermined threshold value while the stopped state of said drive power source is detected by said state-of-drive power source detection means, and said oil pump drive control means stops said second oil pump responsive to detection of a rotational speed by said drive power source rotational speed detection means which is greater than or equal to the second predetermined threshold value while the driving state of said drive power source is detected by said state-of-drive power source detection means.

10. An oil pump drive control apparatus according to claim 8, wherein said drive power source includes an engine and an electric motor that transfer drive power to an input shaft of the automatic transmission, and wherein the vehicle is a hybrid vehicle in which said engine and said electric motor are drivable and stoppable in accordance with a running condition of the vehicle.

11. An oil pump drive control apparatus according to claim 8 further comprising a battery and an electric motor powered by said battery, independently of said drive power source, for driving said second oil pump.

12. An oil pump drive control apparatus according to claim 11 wherein said drive power source includes an engine and a motor-generator.

13. An oil pump drive control apparatus for a vehicle comprising:

a drive power source for running the vehicle;

a first oil pump driven by said drive power source;

a second oil pump driven independently of said drive power source;

a hydraulic controller which receives an oil pressure generated by said first oil pump and said second oil pump and which performs a speed shift by hydraulically controlling a plurality of friction engagement elements of an automatic transmission of the vehicle;

oil pressure detection means for detecting, as a control parameter, an oil pressure output by said hydraulic controller apparatus to a friction engagement element that transfers drive power from said drive power source to a speed shift mechanism of the automatic transmission; and oil pump drive control means for driving aid second oil pump so as to maintain an oil pressure needed for the hydraulic control of the friction engagement elements responsive to the control parameter detected by said detection means.

* * * * *